(12) United States Patent
Nielsen

(10) Patent No.: US 6,834,990 B2
(45) Date of Patent: Dec. 28, 2004

(54) IMPELLER FOR MIXING SMALL VOLUMES OF REACTION MATERIALS

(75) Inventor: Ralph B. Nielsen, San Jose, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 0 days.

(21) Appl. No.: 10/408,812

(22) Filed: Apr. 8, 2003

(65) Prior Publication Data

US 2003/0169638 A1 Sep. 11, 2003

Related U.S. Application Data

(62) Division of application No. 09/961,641, filed on Sep. 24, 2001, now Pat. No. 6,582,116.

(51) Int. Cl.[7] .................................................. B01F 7/00
(52) U.S. Cl. .................. 366/197; 366/325.92; 366/297; 366/342
(58) Field of Search .......................... 366/19, 247, 343, 366/129, 605, 325.92, 342, 279, 292, 297, 197; 422/99, 243

(56) References Cited

U.S. PATENT DOCUMENTS

| | | | | |
|---|---|---|---|---|
| 94,830 A | | 9/1869 | King | |
| 166,181 A | * | 8/1875 | Barden et al. | 366/343 |
| 1,101,199 A | * | 6/1914 | Legg et al. | 366/247 |
| 1,111,374 A | | 9/1914 | Goddard et al. | |
| 1,281,610 A | | 10/1918 | Lundahl | |
| 1,409,209 A | * | 3/1922 | Wolfe | 366/343 |
| 1,841,434 A | * | 1/1932 | Gibson | 366/129 |
| 1,948,431 A | * | 2/1934 | Rolph | 416/79 |
| 2,025,379 A | | 12/1935 | Croasdale, Jr. | |
| 2,027,297 A | * | 1/1936 | Tramposch | 366/605 |
| 2,088,336 A | * | 7/1937 | Neitzke | 366/325.3 |
| 2,202,860 A | | 6/1940 | McPhee et al. | |
| 2,484,391 A | | 10/1949 | Treiss, Jr. | |
| 2,637,537 A | | 5/1953 | Ernst | |

(List continued on next page.)

FOREIGN PATENT DOCUMENTS

| | | |
|---|---|---|
| EP | 0 635 713 A1 | 1/1995 |
| FR | 1418.757 | 10/1965 |
| GB | 989424 | 4/1965 |
| GB | 1408199 | 10/1975 |
| WO | WO 99/30817 | 6/1999 |
| WO | WO 00/09255 | 2/2000 |
| WO | WO 01/21302 A1 | 3/2001 |
| WO | WO 01/36087 A1 | 5/2001 |

OTHER PUBLICATIONS

"Experimental Manager Software for an Automated Chemistry Workstation, Including a Scheduler for Parallel Experimentation," Corkan, et al, *Chemometrics and Intelligent Laboratory Systems: Laboratory Information Management*, 17 (1992) Oct., No. 1, 47–74.

Andrews, Hsiao, "Parallel Catalyst Screening Instrumentation", *Chimica OGGI/chemistry today*, Mar./Apr. 2001, 3 pages, San Carlos, CA, USA.

Primary Examiner—Tony G. Soohoo
(74) Attorney, Agent, or Firm—Senniger Powers

(57) ABSTRACT

Method and apparatus for mixing small volumes of reaction components. In one application, a plurality of removable vessels are placed in a parallel reactor, and reaction components are delivered to each vessel. An impeller is rotated in each vessel to mix the components. Each impeller has a rotary shaft and at least one blade on the shaft for placement in the reaction components. The blade is dimensioned so that one rotation of the impeller causes the blade to sweep out a sweep volume representing a large amount of the fill volume of the vessel.

27 Claims, 8 Drawing Sheets

U.S. PATENT DOCUMENTS

| | | | |
|---|---|---|---|
| 2,766,022 A | | 10/1956 | Bender |
| 2,991,161 A | | 7/1961 | Gasche |
| 2,996,363 A | | 8/1961 | Ruyak |
| 3,012,977 A | * | 12/1961 | Wilson et al. .......... 366/325.92 |
| 3,179,380 A | * | 4/1965 | Drayer ................. 366/325.92 |
| 3,319,940 A | | 5/1967 | Mentnech |
| 3,455,540 A | | 7/1969 | Marcmann |
| 3,456,923 A | | 7/1969 | Zeuzem |
| 3,603,564 A | | 9/1971 | Price et al. |
| 3,697,053 A | | 10/1972 | Will |
| 3,744,767 A | * | 7/1973 | Blasnik ..................... 366/243 |
| 4,037,826 A | | 7/1977 | Hulslander et al. |
| 4,065,107 A | | 12/1977 | Van Horbek |
| 4,106,825 A | | 8/1978 | Ruyak |
| 4,175,875 A | | 11/1979 | Van Horbek |
| 4,229,110 A | | 10/1980 | Lücke |
| 4,243,636 A | * | 1/1981 | Shiraki et al. ......... 366/625.92 |
| 4,339,992 A | * | 7/1982 | Kurland ..................... 366/343 |
| 4,355,906 A | | 10/1982 | Ono |
| 4,438,074 A | | 3/1984 | Wilt |
| 4,469,445 A | | 9/1984 | Wurtz |
| 4,506,982 A | | 3/1985 | Smithers et al. |
| 4,594,228 A | | 6/1986 | Lambert, Jr. et al. |
| 4,692,029 A | * | 9/1987 | Davis ........................ 366/343 |
| 4,702,888 A | | 10/1987 | Borgialli |
| 4,799,862 A | | 1/1989 | Davidson et al. |
| 4,810,099 A | | 3/1989 | Langsetmo et al. |
| 4,879,917 A | * | 11/1989 | Eppelmann et al. ........ 366/343 |
| 4,924,444 A | * | 5/1990 | Castellanos .................. 366/129 |
| 4,941,752 A | * | 7/1990 | Yant et al. ................... 366/307 |
| 4,983,046 A | | 1/1991 | Murata et al. |
| 5,074,671 A | | 12/1991 | Roueche et al. |
| 5,098,669 A | | 3/1992 | Kawanami et al. |
| 5,117,550 A | * | 6/1992 | Nadeau et al. ............... 366/129 |
| 5,145,255 A | | 9/1992 | Shimada et al. |
| 5,154,891 A | | 10/1992 | Brenner |
| 5,217,695 A | | 6/1993 | Augustine et al. |
| RE34,386 E | | 9/1993 | Davidson et al. |
| 5,297,867 A | | 3/1994 | Holman |
| 5,304,355 A | | 4/1994 | Yant et al. |
| 5,316,728 A | | 5/1994 | Hayashi et al. |
| 5,399,014 A | | 3/1995 | Takata et al. |
| 5,407,270 A | * | 4/1995 | Barile et al. ........... 366/325.92 |
| 5,439,236 A | | 8/1995 | Musil |
| 5,472,278 A | * | 12/1995 | Kawaoka et al. ....... 366/325.92 |
| 5,533,805 A | * | 7/1996 | Mandel ....................... 366/197 |
| D385,466 S | * | 10/1997 | Bellomo ....................... D8/16 |
| 5,698,163 A | | 12/1997 | Mandel |
| 5,714,127 A | | 2/1998 | DeWitt et al. |
| 5,738,439 A | | 4/1998 | Flower |
| 5,857,772 A | * | 1/1999 | Washington ................. 366/605 |
| 5,871,278 A | | 2/1999 | Harry et al. |
| 5,980,099 A | * | 11/1999 | Soon ........................ 366/204 |
| 6,086,831 A | | 7/2000 | Harness et al. |
| 6,109,780 A | * | 8/2000 | Lesniak ....................... 366/247 |
| 6,126,904 A | | 10/2000 | Zuellig et al. |

* cited by examiner

IMPELLER FOR MIXING SMALL VOLUMES OF REACTION MATERIALS

This application is a divisional application based on U.S. Ser. No. 09/961,641, filed Sep. 24, 2001, now U.S. Pat. No. 6,582,116.

BACKGROUND OF THE INVENTION

The present invention relates generally to apparatus and methods for mixing small volumes of materials and, in particular, to such apparatus and methods as used in a parallel reactor in which chemical reactions are conducted simultaneously using small volumes of reaction materials to efficiently and economically screen large libraries of chemical materials in a combinatorial (i.e., high-throughput) process.

In a parallel reaction procedure, small volumes of reaction materials (e.g., liquids) are placed in an array of reaction vessels, each having a volume which is preferably less than about 100 ml, and more preferably less than about 30 ml., the vessels being contained within one or more reaction blocks of a reactor system. The contents of each vessel (which may include a mixture of liquids, solids and/or gases) are mixed in an effort to obtain a substantially homogeneous solution. Various mechanisms have been used for such mixing, including but not limited to high-speed shaft-driven rotational stirrers, magnetic flea stirring bars, orbital shakers, and vibratory devices. However, due at least in part to the relatively small sizes of the vessels and mixing implements, efficient mixing has been difficult to achieve. There is a need, therefore, for an improved apparatus and method for achieving effective mixing in a parallel reactor and, more broadly, in other applications involving mixing materials in small vessels.

For details regarding the construction and operation of prior parallel reactors using high-speed stirring mechanisms, reference may be made to co-owned International Application No. PCT/US 99/18358, filed Aug. 12, 1999 by Turner et al., entitled Parallel Reactor with Internal Sensing and Method of Using Same, published Feb. 24, 2000 (International Publication No. WO 00/09255), co-owned provisional U.S. application Ser. No. 60/264,489, filed Jan. 26, 2001, by Jonah R. Troth et al, entitled Apparatus and Methods for Parallel Processing of Multiple Reaction Mixtures, and co-owned pending U.S. application Ser. Nos. 60/209,142 filed Jun. 3, 2000 by Safir et al., titled Parallel SemiContinuous or Continuous Stirred Reactors, 60/255, 716 filed Dec. 14, 2000 by Safir et al., titled Parallel SemiContinuous or Continuous Stirred Reactors, and 09/873,176, filed Jun. 1, 2001, by Nielsen et al., titled Parallel SemiContinuous or Continuous Reactors. These applications are incorporated herein by reference for all purposes.

SUMMARY OF THE INVENTION

Among the several objects of this invention may be noted the provision of improved apparatus and methods for mixing small volumes of fluids, such as small volumes of liquid reaction materials in parallel research reactors; the provision of such apparatus and methods which achieve a more homogeneous mixture of such materials; the provision of a vessel and impeller designed to achieve effective mixing of volumes of material preferably less than about 20 ml, and more preferably no more than about 10 ml; the provision of such a vessel and impeller which are designed for economical manufacture; and the provision of such an impeller which may be quickly and easily coupled to a mechanical drive for rotation of the impeller at speeds suitable for mixing.

In general, a method of the present invention method involves mixing reaction components in a parallel reactor. The method comprises positioning a plurality of removable vessels in the reactor, each vessel as so positioned having a closed bottom, a side wall extending up from the bottom, an open top, and an overall capacity. Reaction components to be mixed are delivered to each of the vessels to fill each vessel up to a fill level spaced above the bottom of the vessel and below the top of the vessel, the reaction components thus occupying a fill volume of the vessel less than said overall capacity. An impeller in each vessel is rotated to mix the reaction components in the vessel, each impeller comprising a rotary shaft and at least one blade on the shaft positioned in said fill volume. The at least one blade of each impeller is dimensioned such that one rotation of the impeller causes the at least one blade to sweep out a sweep volume representing about 20%–50% of said fill volume of a respective vessel.

Another aspect of the present invention is directed to mixing apparatus for use in a parallel reactor. The apparatus comprises a vessel for containing reaction components to be mixed, the vessel having a closed bottom, a side wall extending up from the bottom, and an open top. The vessel has an overall capacity of less than about 50 ml and a height to inside diameter ratio of less than 5.0. The apparatus further comprises an impeller for mixing the reaction components in the vessel. The impeller comprises a rotary shaft adapted to be positioned in the vessel, and at least one blade on the shaft having an upper edge, a lower edge and opposite side edges, a width between the side edges at least 60% of the diameter of said vessel, and a blade area as viewed in vertical broadside profile sufficient to sweep out a sweep volume at least 10% of the overall volume of the vessel during one revolution of the blade in the vessel.

The present invention is also directed to a parallel reactor comprising a plurality of reactor vessels for containing reaction components, each vessel having a closed bottom, a side wall extending up from the bottom defining an overall capacity of said vessel of less than 50 ml and an open top, and a central vertical axis. The vessel has a height to inside diameter ratio of about 5.0 or less. The reactor also includes a plurality of impellers, one for each vessel, for mixing the reaction components. Each impeller comprises a rotary shaft adapted to extend down into the vessel and having an axis of rotation, and at least one blade on the shaft immersible in the reaction components in the vessel for mixing the components upon rotation of the shaft. The at least one blade has a blade area sufficient to sweep out a sweep volume at least 10% of the overall volume of the vessel during one revolution of the blade in the vessel.

In another aspect, the present invention is directed to an impeller used for mixing a volume of less than 50 ml contained in a vessel. The impeller comprises a rotary shaft having a longitudinal axis, at least one substantially flat longitudinal blade on the shaft adapted to be positioned in the reaction components in the vessel for mixing the components upon rotation of the shaft. The blade has an overall width and an overall longitudinal length greater than said width.

This invention is also directed to an impeller comprising a rotary shaft having a longitudinal axis, and at least one substantially flat longitudinal blade on the shaft adapted to be positioned in the reaction components in the vessel for mixing the components upon rotation of the shaft. The blade has a body and a narrow longitudinal extension projecting from the body.

In yet another aspect, a method of this invention for mixing a small volume of liquid comprises placing no more than 10 ml of a combination of liquid and/or solid materials into a vessel so that the materials occupy a fill volume of the vessel, the vessel having a closed bottom, a side wall and an open top. An impeller is rotated in the vessel to mix the combination of materials. The impeller has a rotary shaft and at least one blade on the shaft positioned in the materials during rotation of the impeller. The at least one blade has a blade area dimensioned such that one rotation of the impeller sweeps out a volume corresponding to at least 20% of said fill volume.

Another method of the present invention for mixing a small volume of material comprises placing a combination of liquid and/or solid materials into a vessel having a closed bottom, a side wall, an open top and an overall capacity of less than 50 ml. An impeller is rotated in the vessel to mix the combination of materials. The impeller has a rotary shaft and at least one blade on the shaft positioned in the materials during rotation of the impeller. The at least one blade has a blade area dimensioned such that one rotation of the impeller sweeps out a volume corresponding to at least about 10% of said overall capacity of the fill vessel.

Other objects and features of this invention will be in part apparent and in part pointed out hereinafter.

BRIEF DESCRIPTION OF THE DRAWINGS

Corresponding parts are designated by corresponding reference numbers throughout the drawings.

DETAILED DESCRIPTION OF PREFERRED EMBODIMENTS

Referring now to FIGS. 1–4 of the drawings, mixing apparatus of the present invention, generally designated 1, is shown as comprising an impeller, generally indicated at 3, for mixing reaction materials contained within a vessel 5. As will be explained in detail below, apparatus 1 is useful for mixing small amounts of materials having a combined volume preferably less than about 50 ml, more preferably less than about 20 ml, and most preferably no more than about 10 ml. The materials being mixed can be liquids or combinations of liquids, solids and/or gases.

Figure 1:
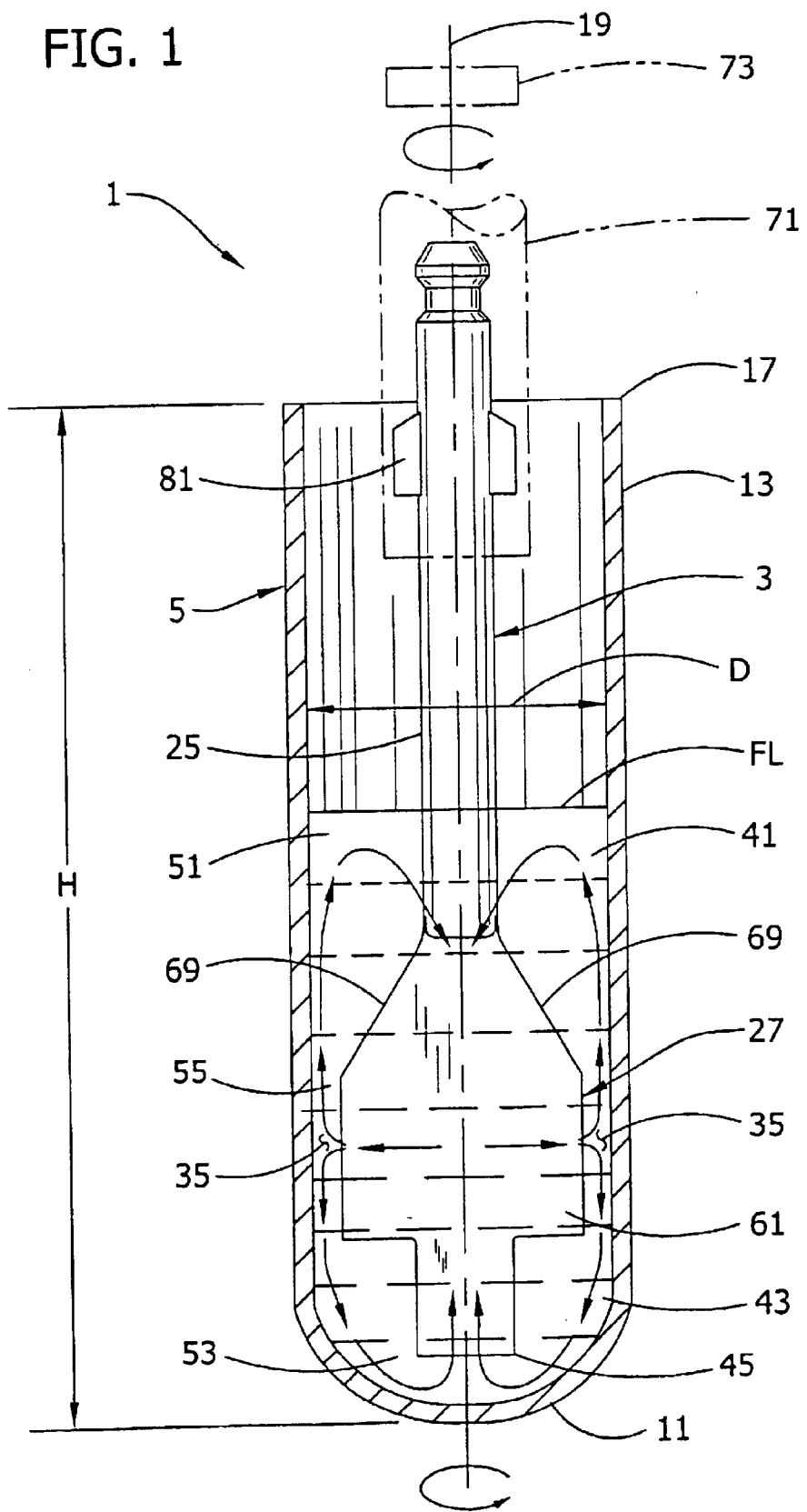
FIG. 1 is a side elevation of mixing apparatus of the present invention.

In accordance with the present invention, the impeller and vessel are configured to effect more efficient mixing of the contents of the reaction vessel than prior designs. In the embodiment shown in FIG. 1, the vessel 5 comprises a vial having a rounded bottom 11, a generally cylindric side wall 13 extending up from the bottom, an open top defined by an upper rim 17 of the vessel, and a central longitudinal axis 19. The vessel has an overall height H and an inside diameter D. The inside surfaces of the vessel shown in FIG. 1 are smooth and without baffles of any type. The vessel 5 is filled with liquid and/or solid components to be mixed up to a fill level FL, which is typically in the range of 5–95% of the overall volume or capacity of the vessel, and preferably about 50% of the overall volume or capacity, but which may vary considerably, depending on the particular reaction. (The volume occupied by the liquid and any solid materials in the vessel is hereinafter referred to as the "fill volume".) For small-volume mixing, the vessel should have an overall capacity of less than about 100 ml, and preferably no more than about 50 ml. The vessel should further have a height to inside diameter ratio (H/D) in the range of 0.5–5.0, preferably less than 2.0, and most preferably about 1.0–1.5, to ensure uniform top to bottom mixing within the vessel. The shape of the vessel 5 may vary from the shape shown in FIG. 1 (e.g., the vessel may have a non-circular cross section and/or a non-rounded bottom).

Still referring to FIGS. 1–4, the impeller 3 is illustrated as comprising a generally vertical rotary shaft 25 having a longitudinal axis depicted as generally coincident with the longitudinal axis of the vessel, and at least one substantially flat vertical blade 27 on the shaft adapted to be positioned in the reaction components in the vessel for mixing the components upon rotation of the shaft. For efficient mixing, the impeller has a blade area as viewed in vertical broadside profile (see FIG. 1) sufficient to sweep out a sweep volume which is at least 10%, and preferably at least 20%, of the overall volume or capacity of the vessel. Further, the sweep volume of the blade should be in the range of from about 20–50%, and preferably at least about 35%, of the fill volume of the vessel during one revolution of the blade 27 in the vessel. By way of example, if the fill volume is 20 ml, the blade may sweep out a volume of about 4–10 ml, and preferably about 7–10 ml, during one rotation of the impeller. Still further, the impeller 3 is sized and configured to have a width W of 60–95% of the inside diameter D of the vessel, more preferably about 70–90% of the inside diameter of the vessel, and most preferably at least 80% of the inside diameter D of the vessel 5, thus providing gaps 35 between the sides of the blade 27 and the side wall 13 of the vessel to permit vertical flow of the materials in the vessel through the gaps during rotation of the impeller 3 to encourage longitudinal mixing within the vessel, as indicated by the arrows in FIG. 1. (The arrows in FIG. 1 represent only one of the many possible flow patterns which may exist in the vessel.) These gaps 35 may vary in size depending on the physical properties (e.g., viscosity) of the materials being mixed, but as a general matter, the gaps are preferably in the range of 0.3–7.5 mm., and more preferably about 1.5 mm. Without wishing to be bound by any particular theory, it is believed that as the impeller rotates, material is accelerated by the blade 27 in a radial direction against the side wall 13 of the vessel 5 where it flows in upward and downward directions to create upper and lower vortices 41, 43 (which may also be referred to as re-circulation zones) to effect more efficient mixing within the vessel. The relatively large size of the blade compared to the overall fill volume ensures that vortical energy is transferred to the material in an amount sufficient to effect good mixing.

Figure 2:
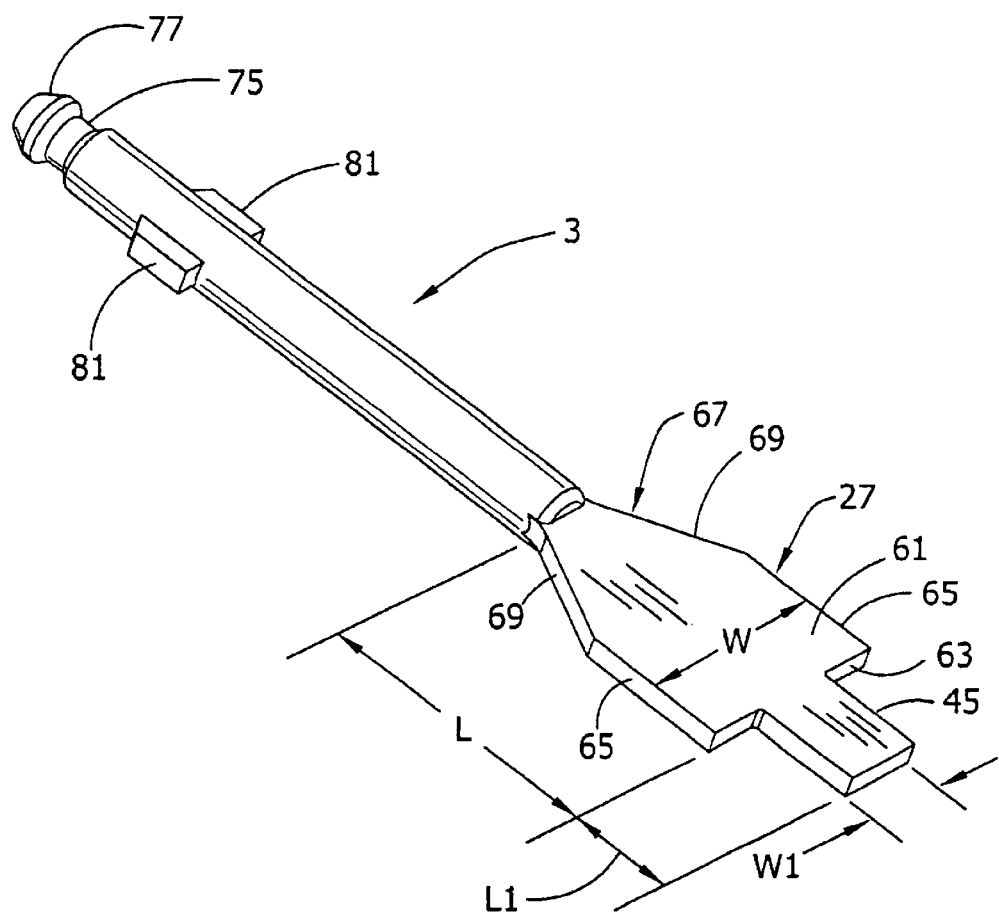
FIG. 2 is a perspective of an impeller of the mixing apparatus.
Figure 3:
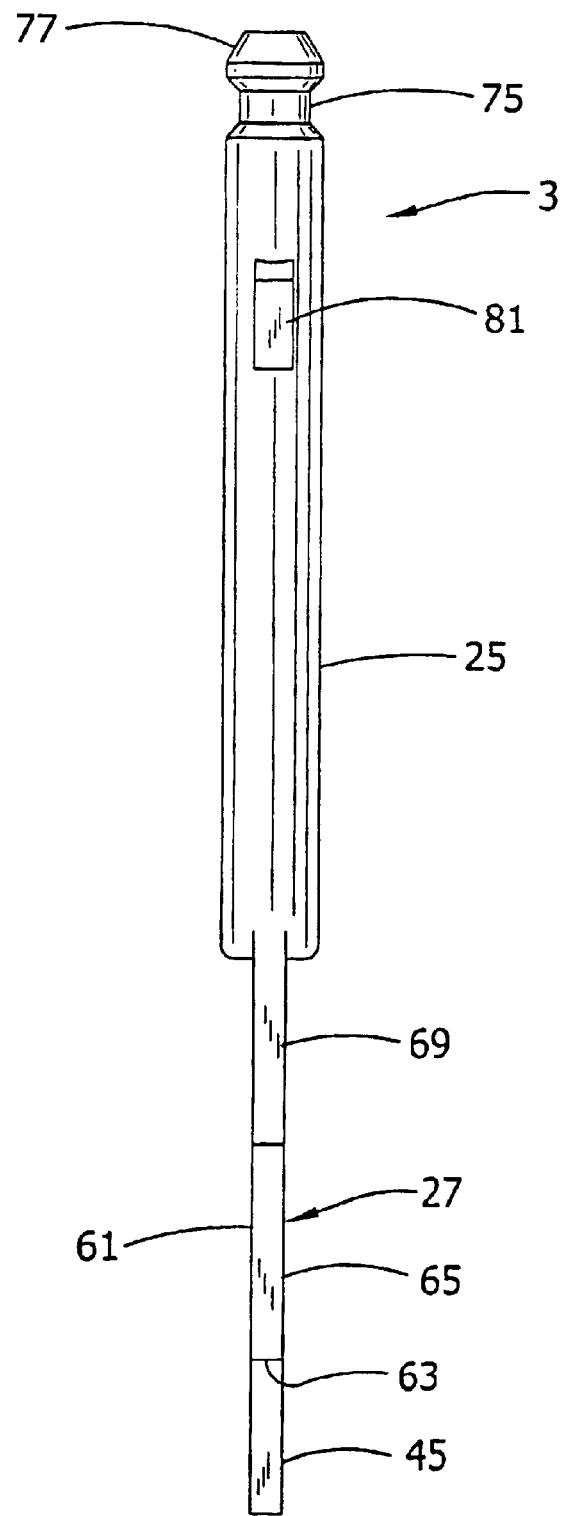
FIG. 3 is a side elevation of the impeller.
Figure 4:
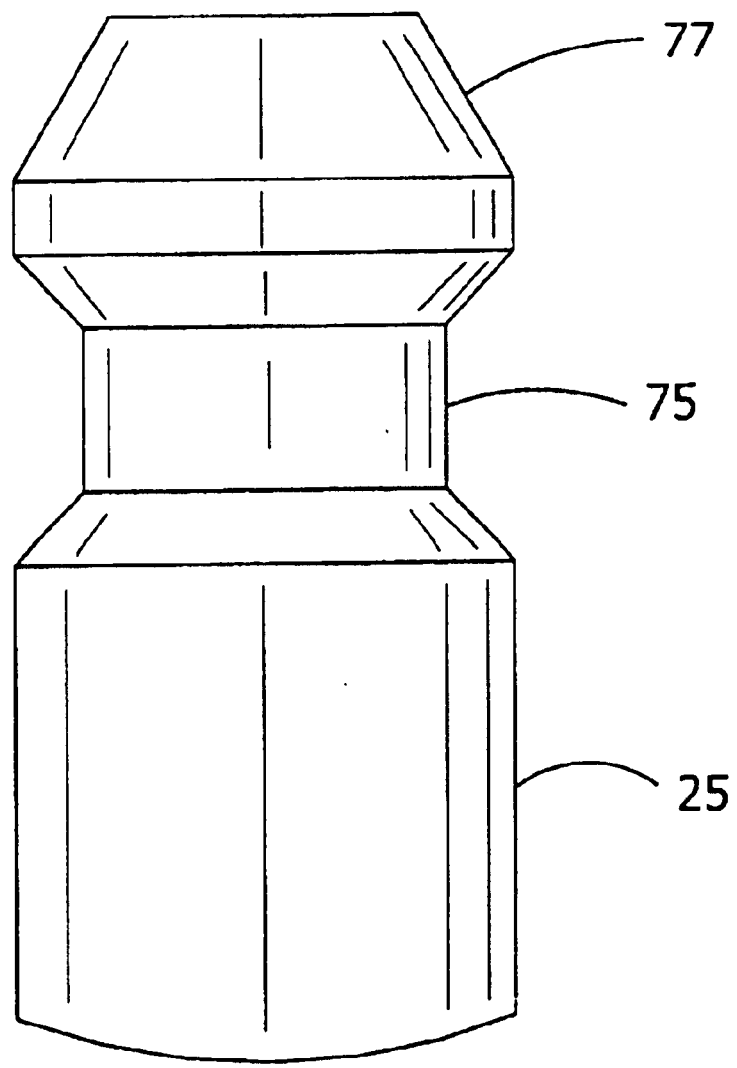
FIG. 4 is an enlarged view of a formation on the impeller for releasably coupling the impeller to a drive mechanism.

In the particular embodiment shown in FIG. 2, the impeller 3 has only one blade 27 having a thin flat generally rectangular body 61 with a lower edge 63, opposite side edges 65 and an upper edge 67 defined by a pair of shoulders 69 tapering up from the body 61 to the shaft 25 at an angle of, for example, 45 degrees. (This angle may vary.) The shoulders 69 lie in a plane coincident with the body and are substantially symmetric about the longitudinal axis 19 of the shaft 25. As shown in FIG. 2, the body 61 of the blade has an overall width W, an overall length L, and a thickness in the range of 0.5–5.0 mm, and preferably about 1.5 mm. The thickness should be sufficient to prevent undue deflection of the blade during mixing (i.e., a degree of deflection which could cause blade failure during the mixing of viscous solutions).

As shown in FIGS. 1 and 2, a relatively narrow extension 45 projects down from the lower edge 63 of the body 61 of the blade, generally co-linear with the shaft 25. In the particular embodiment illustrated, the extension 45 is generally rectangular, having an overall width W1 less than the width W of the body, an overall length L1 less than the length L of the body, and a thickness which is preferably (but not necessarily) the same as the thickness of the body 61. In the event the fill level FL of the materials in the vessel is below the body 61 of the blade (as during mixing of very small volumes of material, or as during a process where the reaction is initiated with only a very small volume of material and additional materials are added over time), the relatively narrow extension 45 will mix the materials. The specific shape of the extension 45 is not critical, but it should be narrower than the body 61 of the blade. In a preferred form, the entire impeller is of one-piece construction, molded from a suitable chemically inert and resistant material such as plastic (e.g., PEEK), although other materials both metallic (e.g., stainless steel) and non-metallic having the same qualities are also suitable.

For optimal results, the blade 27 should be properly positioned in the reaction materials being mixed. In this regard, the fill volume of each vessel comprises upper, lower and intermediate zones, indicated at 51, 53 and 55, respectively, in FIG. 1. If there is sufficient material in the vessel, the blade(s) of the impeller 3 should be located primarily in the intermediate zone 55, spaced above the bottom 11 of the vessel and below the fill level FL of the vessel, so that the blade(s) is substantially immersed in the material to be mixed and out of contact with the inside surfaces of the vessel. Rotation of the impeller 3 when the blade 27 is positioned in this manner will cause strong vortex flows in the upper and lower zones 51, 53 to achieve good mixing. The blade extension 45 tends to enhance this vortical action.

The rotary shaft 25 of the impeller 3 is preferably formed for releasable engagement with a coupling device 71 of a suitable drive mechanism 73 for rotating the impeller. (The coupling device 71 and drive mechanism 73 are shown in phantom in FIG. 1.) In the embodiment of FIGS. 1–4, for example, the rotary shaft has a circumferential groove 75 generally adjacent its upper end, and a conical formation 77 immediately above the groove which may be inserted into the aforementioned coupling device 71 until a suitable detent mechanism of the device (not shown) snaps into the groove to releasably lock the shaft 25 in place. A pair of lugs 81 projecting laterally outwardly from opposite sides of the rotary shaft 25 below the groove 73 also engage the coupling device 71 for holding the shaft against rotation relative to the device. The conical formation 77, shaft 27 and lugs 81 are preferably of unitary construction (e.g., molded as one piece). Other types of mechanisms may be used for connecting the shaft 27 to the coupling device 71 of a drive mechanism. Exemplary connections are described in the aforementioned Publication Ser. No. WO 00/09255, and Application Ser. Nos. 60/209,142, 60/255,716 and 09/873, 176. The coupling device 71 could also be a vertical drive shaft of the drive mechanism having a tubular lower end with axial slits in it forming resilient fingers which expand to accept the end of the impeller and then grip the impeller to hold it.

The impeller 3 is preferably rotated at high speeds of up to 3000–5000 rpm, and preferably at speeds in the range of 300–1500 rpm. At these speeds, the tip speed of the blade(s) 27 is sufficient to deliver considerable mixing energy to contents of the vessel to cause the necessary turbulence to effect efficient mixing, even though the blade width dimension W (FIG. 2) is relatively small (e.g., 6 mm).

Figure 5:
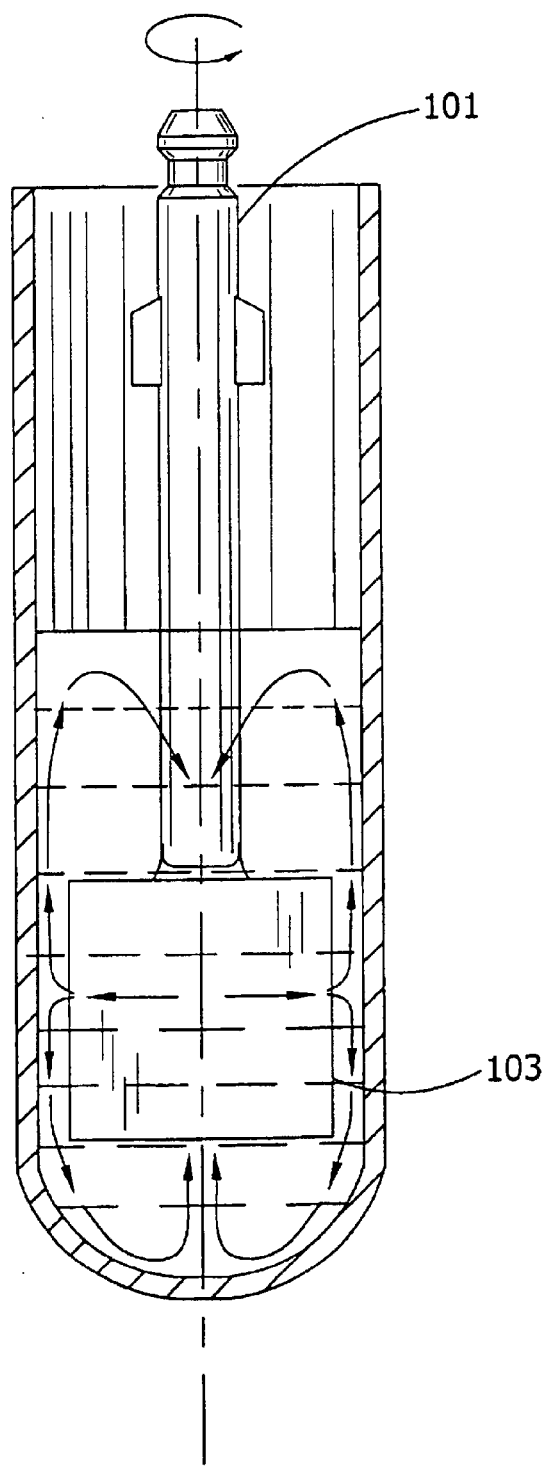
FIG. 5 is a second embodiment of the mixing apparatus.

The impeller 3 of the present invention may take configurations other than that shown in FIGS. 1–4. For example, FIG. 5 illustrates an impeller, generally designated 101, having a rectangular flat blade 103 without the tapered shoulders and extension 45 of the previous design. An impeller of the present invention can have more than one blade. Further, the blade(s) can have shapes different than the shape shown in the drawings. For example, instead of being flat, the blade(s) can be curved, e.g., similar to twisted ribbon or propeller. It is important, however, that the blade surface area be sized to have the necessary sweep volume discussed above.

The impellers 3, 101 described above have the additional advantage of being easy and inexpensive to manufacture. The relatively flat symmetric design shown in FIGS. 1–4 is particularly efficient because it can be molded using a simple two-part mold.

Figure 6:
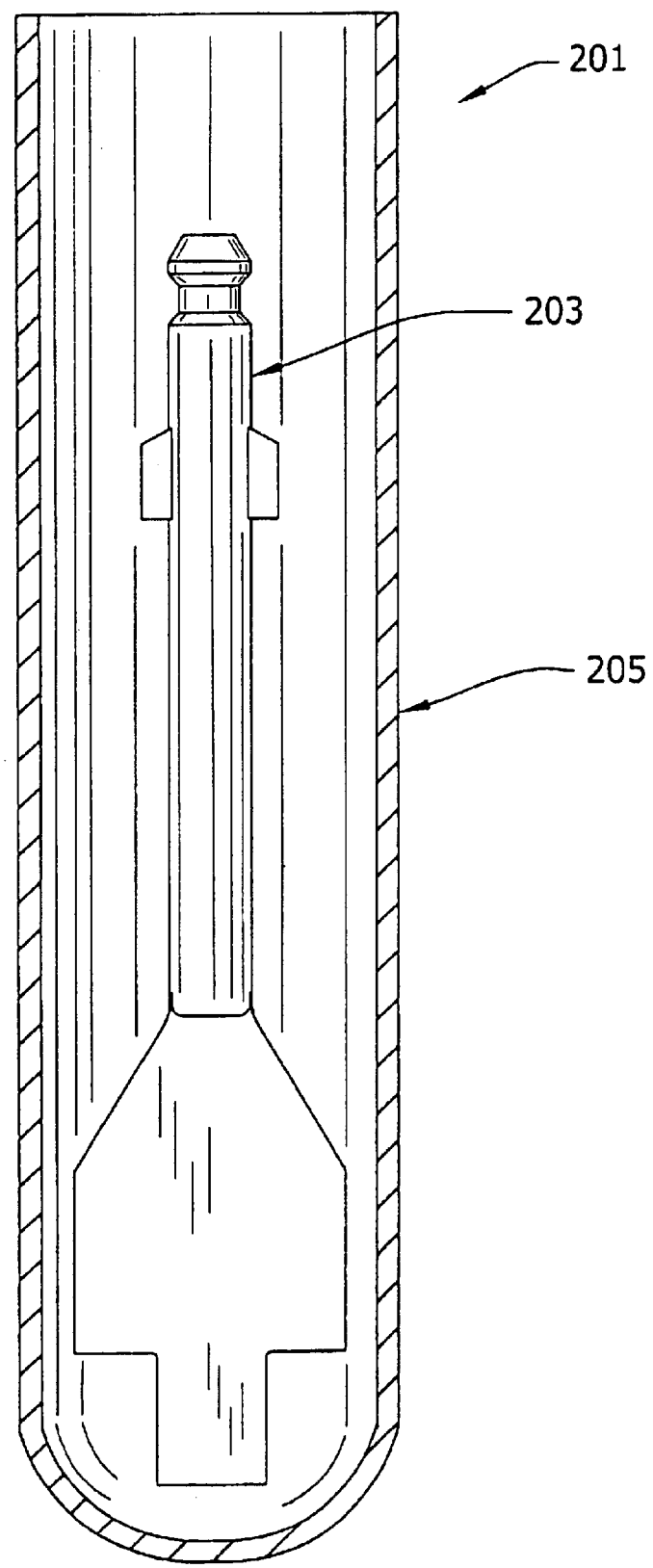
FIG. 6 is a third embodiment of the mixing apparatus.

FIG. 6 shows mixing apparatus 201 comprising an impeller 203 identical to the impeller 3 of FIG. 1 and a vessel 205 similar to the vessel 5 shown in FIG. 1. The vessel 205 differs only in that it is somewhat taller, so that the height to diameter ratio of the vessel is greater than the ratio of the vessel of FIG. 1.

The mixing apparatus of the present invention can be used for mixing small volumes of materials in virtually any application. One such application is in parallel reactors used in combinatorial chemistry, where multiple chemical reactions are processed simultaneously, i.e., during at least overlapping time periods. A parallel reactor is typically used in research or small-volume production applications, one such reactor being shown schematically in FIG. 7.

Figure 7:
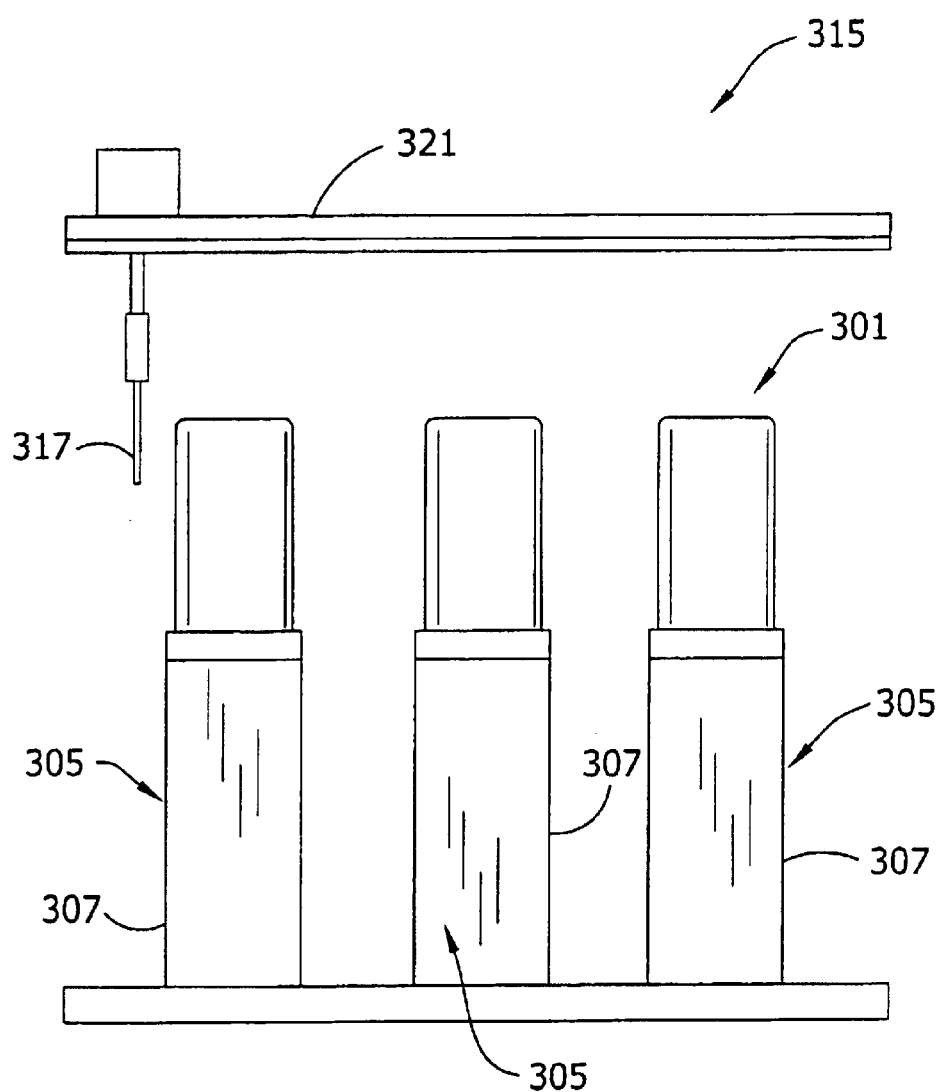
FIG. 7 is a schematic view of a parallel reactor.
Figure 8:
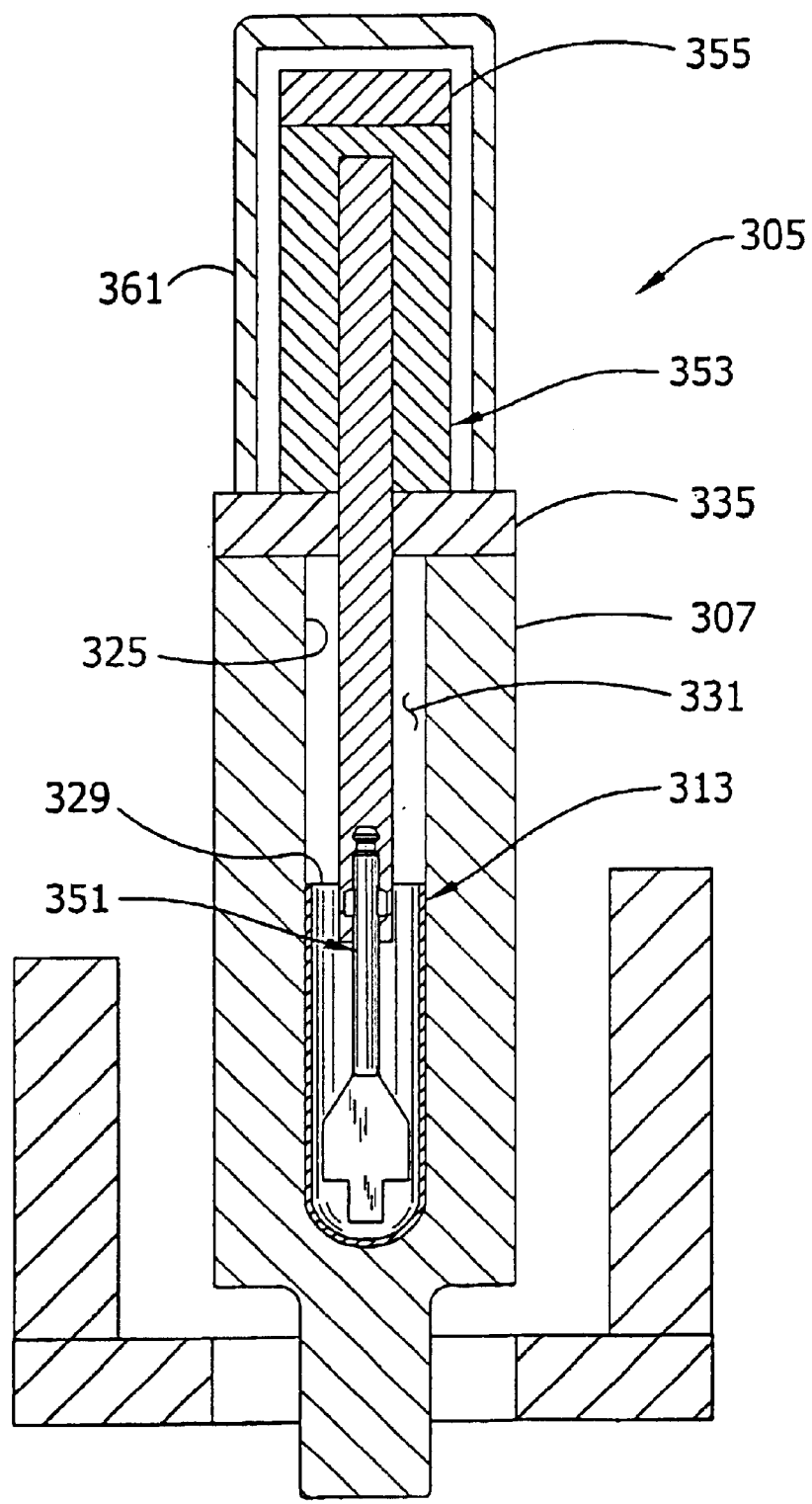
FIG. 8 is a cross sectional view showing mixing apparatus of the present invention used in a parallel reactor application.

The reactor in FIG. 7, designated in its entirety by the reference number 301, comprises a number (two or more) reactor modules 305 each comprising a separate block 307 of metal. Alternatively, the reactor 301 could comprise a single monolithic block. In either case, the reactor contains a plurality of vessels 313 for carrying out a corresponding number of reactions (FIG. 8). Small amounts of reaction materials are placed in the vessels 313 either manually or by an automated materials handling system. One such system 315 is shown in FIG. 7 as comprising a probe or cannula 317 for dispensing measured amounts of fluids into the vessels, and a robot system 321 for moving the cannula, such as described in the aforementioned publication No. WO 00/09255 and application Ser. No. 60/264,489.

In the particular embodiment shown in FIG. 8, the reactor block 307 has a series of wells 325 extending down from the upper surface of the block, one such well being illustrated. Although the wells per se could serve as reactor vessels, it is advantageous to use removable liners or vials 329 as the vessels since they can be inserted in the wells for a reaction process and removed after the process has been carried out. The removable vessels can be discarded after a single use, or cleaned and reused. The removable vessels (e.g., vials)

may be of glass or other suitably chemically inert material capable of withstanding high-temperature chemical reactions. As used herein, the term "vessel" broadly means any structure for confining reaction materials in the reactor, including the walls defining the well 325 and/or the vial 329 or other liner in the well containing the reaction materials.

In the embodiment shown in FIG. 8, the reaction vial 329 has a height substantially less than the height of the well 325, forming a head space 331 within the well above the vial, the head space and interior of the vial combining to form what may be referred to as a reaction chamber. This chamber is sealed closed by a header plate 335 releasably secured by suitable fasteners (not shown) to the reactor block 307. In other embodiments, the vial may extend substantially the full height of the well.

An impeller, generally designated 351 in FIG. 8, is provided for mixing the contents of each vessel in the reactor. The impeller is rotated at speeds up to about 5000 rpm, and preferably at speeds in the range of about 300–1500 by a drive mechanism of any suitable type, including but not limited to the system described in the aforementioned Publication No. WO 00/09255. In one embodiment, the impeller 351 is magnetically coupled (via a magnetic coupling 353) to a gear train 355 driven by a stepper motor (not shown) or brushless DC motor. The gear train 355 and magnetic coupling 353 are enclosed by a cover 361 releasably secured to the header plate 335 on the reactor block. The arrangement is such that the stepper motor rotates the gears of the gear train 355 to drive the magnetic couplings 353 to rotate the impellers 351 in the vessels 313 of the reactor module 305. It will be understood that the impeller can be rotated by other types of drive systems, including but not limited to direct drive gear systems, and even manually operable systems. Further, each impeller may be rotated by an independent drive system so that the rotational speed of the impeller can be varied independent of the speed of the other impellers.

Referring again to FIG. 8, the drive mechanism is releasably coupled to the impeller by a coupling device, described above.

The general operation of a parallel reactor 301 using mixing apparatus of the present invention will now be described. Reaction materials to be processed in the reactor are delivered to the vessels 313 in the reactor, usually by an automated robot system 321 of the type shown in FIG. 7, although other automated or manual delivery systems may be used. This delivery typically takes place after the vials 313 have been placed in the reactor, but it could take place before placement of the vials in the reactor. In any event, the total volume of materials delivered to each vessel is preferably less than about 50 ml, more preferably less than about 20 ml, and even more preferably about 10 ml or less. After (or while) the materials to be mixed are placed in the vessels, the impellers 351 are rotated at desired speeds of up to 1000–5000 rpm by energizing the drive mechanisms to transmit rotational forces to the impellers via the drive couplings.

Rotation of an impeller 351 in its respective vessel causes the blade(s) 27 of the impeller to fling material out from the center of the vessel toward the side wall of the vessel, where the material is directed to flow through the gaps (e.g., gaps 35 in FIG. 1) between the blade(s) and the side wall either along a lower vortex flow path toward the bottom of the vessel or along an upper vortex flow path toward the top of the vessel, thereby achieving efficient top to bottom mixing of the materials. Efficient mixing is achieved also because the volume of material swept out by the blade(s) during a single rotation of the impeller ("sweep volume") represents a relatively large fraction (20–50%) of the overall fill volume of the material, so that substantial energy is transmitted to the materials being mixed. After the parallel reaction is complete, the upper plate 335, impellers 351 and drive mechanisms are removed as a unit (in the preferred embodiment) from the reactor block, following which the impellers are released from their respective coupling devices so that they can be cleaned for reuse or discarded and replaced by new impellers.

As noted previously, the exact dimensions of an impeller and vessel of the present invention will vary within the parameters explained above. By way of example, however, the vessel 3 of FIG. 1 may have an inside diameter D of about 15 mm, an overall height H of about 75 mm, a capacity of about 13 ml., and be filled with 5.5 ml of water and 0.5 ml of hexane (or 0.5 ml of methylene chloride) to a fill level FL of about 35 mm. above the bottom of the vessel, the fill volume thus being 6 ml. The impeller 3 of FIGS. 1 and 2 may have a blade 27 with a width W of about 12.5 mm, a length L of about 16 mm, a length L1 of about 6.0 mm and a width W1 of about 5.0 mm. Using this particular example, the sweep volume of the blade would be about 28% of the fill volume.

Further by way of example, and not limitation, the impeller of FIG. 5 may have a 12 mm×12 mm flat square blade and no longitudinal extension.

While the impellers described above are illustrated as extending down through the open tops of the vessels, it is contemplated that the impellers could extend up through the bottoms of the vessels, with appropriate seals being used to prevent leakage.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. An impeller used for mixing reaction components in a volume of less than 50 ml contained in a vessel having an overall capacity of less than about 50 ml, said impeller comprising a rotary shaft having a longitudinal axis, and at least one substantially flat longitudinal blade on the shaft adapted to be positioned in the reaction components in the vessel for mixing the components upon rotation of the shaft, said blade having an overall width, substantially perpendicular to said longitudinal axis, and an overall longitudinal length, substantially parallel to said longitudinal axis, greater than said width, said blade being sized for receipt in said vessel for mixing said reaction components, such that one rotation of the impeller causes the blade to sweep out a sweep volume of less than about 50 ml.

2. An impeller as set forth in claim 1 wherein said at least one blade comprises a body which is thin, generally rectangular, and substantially symmetric about said longitudinal axis of the shaft.

3. An impeller as set forth in claim 2 wherein said at least one blade has a pair of shoulders tapering upward from the body to the shaft at an angle of about 45 degrees, said shoulders lying in a substantially vertical plane coincident with said body.

4. An impeller as set forth in claim 1 wherein said at least one blade comprises a body having a narrow mixing extension projecting longitudinally down from the body.

5. An impeller as set forth in claim 4 wherein said mixing extension has an overall length, substantially parallel to said longitudinal axis, less than the length of the body of the blade.

6. An impeller as set forth in claim 1 wherein said at least one blade is constituted by a single blade molded as one piece with said shaft.

7. An impeller as set forth in claim 1 further comprising a coupling element on said shaft for releasably coupling said shaft to a drive mechanism for rotating the shaft.

8. An impeller as set forth in claim 1 in combination with said vessel, said vessel having an overall height and an inside diameter, said overall width of the blade being less than said inside diameter of the vessel and said overall longitudinal length of the blade being less than the overall height of the vessel.

9. An impeller as set forth in claim 1 wherein said blade has no openings in it.

10. An impeller as set forth in claim 4 wherein said mixing extension is generally co-linear with the shaft.

11. An impeller as set forth in claim 1 wherein one rotation of the impeller causes the blade to sweep out a sweep volume of less than about 30 ml.

12. An impeller as set forth in claim 11 wherein one rotation of the impeller causes the blade to sweep out a sweep volume of less than about 10 ml.

13. An impeller as set forth in claim 12 wherein one rotation of the impeller causes the blade to sweep out a sweep volume in a range from about 4 ml to about 10 ml.

14. An impeller as set forth in claim 13 wherein one rotation of the impeller causes the blade to sweep out a sweep volume in a range from about 7 ml to about 10 ml.

15. An impeller used for mixing reaction components in a volume of less than 50 ml contained in a vessel, said impeller comprising a rotary shaft having a longitudinal axis, and at least one substantially flat longitudinal blade on the shaft adapted to be positioned in the reaction components in the vessel for mixing the components upon rotation of the shaft, said blade having a body and a narrow longitudinal mixing extension projecting down from the body generally co-linear with the shaft, said blade being sized such that one rotation of the impeller causes the blade to sweep out a sweep volume of less than about 50 ml.

16. An impeller as set forth in claim 15 wherein said mixing extension has an overall length, substantially parallel to said longitudinal axis, less than the length of the body of the blade.

17. An impeller as set forth in claim 15 in combination with said vessel, said vessel having an overall height, an overall inside diameter, and an overall capacity of less than 50 ml, said blade being sized to be received in said vessel for mixing said reaction components.

18. An impeller as set forth in claim 15 wherein said blade has no openings in it.

19. An impeller as set forth in claim 15 wherein one rotation of the impeller causes the blade to sweep out a sweep volume of less than about 30 ml.

20. An impeller as set forth in claim 19 wherein one rotation of the impeller causes the blade to sweep out a sweep volume of less than about 10 ml.

21. An impeller as set forth in claim 20 wherein one rotation of the impeller causes the blade to sweep out a sweep volume in a range from about 4 ml to about 10 ml.

22. An impeller as set forth in claim 21 wherein one rotation of the impeller causes the blade to sweep out a sweep volume in a range from about 7 ml to about 10 ml.

23. A reactor comprising a vessel having an overall capacity of less than about 50 ml, a mixing apparatus for mixing reaction components in the vessel, said mixing apparatus comprising an impeller, said impeller comprising a rotary shaft having a longitudinal axis, and at least one substantially flat longitudinal blade on the shaft sized for reception in said vessel for mixing of the reaction components in the vessel, said blade having an overall width substantially perpendicular to said longitudinal axis, and an overall longitudinal length, substantially parallel to said longitudinal axis, greater than said width, said blade being sized such that one rotation of the impeller causes the blade to sweep out a sweep volume of less than about 50 ml.

24. The reactor as set forth in claim 23 in combination with other vessels and other impellers of the same construction grouped together to form a parallel reactor, wherein said mixing apparatus processes multiple reaction components simultaneously by rotating each of said impellers in a respective vessel.

25. A reactor comprising a vessel having an overall capacity of less than about 50 ml, a mixing apparatus for mixing reaction components in the vessel, said mixing apparatus comprising an impeller, said impeller comprising a rotary shaft having a longitudinal axis, and at least one substantially flat longitudinal blade on the shaft sized for reception in said vessel for mixing the reaction components in the vessel, said blade having a body and a narrow longitudinal mixing extension projecting down from the body, generally co-linear with the shaft, said blade being sized such that one rotation of the impeller causes the blade to sweep out a sweep volume of less than about 50 ml.

26. The reactor as set forth in claim 25 in combination with other vessels and other impellers of the same construction grouped together to form a parallel reactor, wherein said mixing apparatus processes multiple reaction components simultaneously by rotating each of said impellers in a respective vessel.

27. An impeller used for mixing reaction components in a volume of less than 50 ml contained in a vessel having an overall capacity of less than about 50 ml, said impeller comprising a rotary shaft having a longitudinal axis, and a substantially flat longitudinal blade on the shaft adapted to be positioned in the reaction components in the vessel for mixing the components upon rotation of the shaft, said blade having an overall width, substantially perpendicular to said longitudinal axis, and an overall longitudinal length, substantially parallel to said longitudinal axis, greater than said width, said blade having a body which is thin, generally rectangular, and substantially symmetric about said longitudinal axis of the shaft and a narrow longitudinal mixing extension projecting down from the body generally co-linear with the shaft, said blade being sized for receipt in said vessel for mixing said reaction components, such that one rotation of the impeller causes the blade to sweep out a sweep volume of less than about 50 ml.

\* \* \* \* \*